US009755993B2

(12) United States Patent
Ramakrishnan et al.

(10) Patent No.: US 9,755,993 B2
(45) Date of Patent: Sep. 5, 2017

(54) JOINT QUALITY MANAGEMENT ACROSS MULTIPLE STREAMS

(71) Applicant: Cisco Technology Inc., San Jose, CA (US)

(72) Inventors: Sangeeta Ramakrishnan, Saratoga, CA (US); Xiaoqing Zhu, Austin, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 227 days.

(21) Appl. No.: 14/339,644

(22) Filed: Jul. 24, 2014

(65) Prior Publication Data

US 2016/0028651 A1     Jan. 28, 2016

(51) Int. Cl.
G06F 15/16      (2006.01)
H04L 12/911     (2013.01)
(Continued)

(52) U.S. Cl.
CPC ........ H04L 47/828 (2013.01); H04L 41/0896 (2013.01); H04L 41/5067 (2013.01); H04L 47/25 (2013.01); H04L 47/70 (2013.01); H04L 47/76 (2013.01); H04L 65/00 (2013.01); H04L 65/607 (2013.01); H04L 67/10 (2013.01); H04N 21/00 (2013.01); H04N 21/234354 (2013.01);
(Continued)

(58) Field of Classification Search
CPC ......... H04L 47/25; H04L 47/70; H04L 47/76; H04L 47/828
USPC .................................. 709/202-203, 225-229
See application file for complete search history.

(56) References Cited

U.S. PATENT DOCUMENTS 7,366,134 B2 * 4/2008 Bose ..................... H04L 67/322
370/329
8,522,290 B2 * 8/2013 Chakrabarti ........ H04L 65/4084
709/226
(Continued)

FOREIGN PATENT DOCUMENTS

EP       2290894 A1    3/2011
WO       0209429 A2    1/2002
WO    2013043919 A1    3/2013

OTHER PUBLICATIONS

Chikkerur et al, "Objective Video Quality Assessment Methods: A Classification, Review, and Performance Comparison," IEEE Transactions on Broadcasting, IEEE Service Center, Jun. 2011, pp. 165-182, vol. 57, No. 2, Piscataway, NJ, US.
(Continued)

*Primary Examiner* — Bharat N Barot
(74) *Attorney, Agent, or Firm* — Ronald S. Fernando

(57) ABSTRACT

Various implementations disclosed herein enable a more efficient allocation of one or more shared network resources amongst a plurality of client devices based on media content complexity and client device resource status in order to better manage perceptual playback quality. In some implementations, a method includes obtaining a plurality of resource constraint values associated with a plurality of client devices sharing a network resource, and jointly determining a respective encoding rate level selection and a corresponding resource allocation for each of the plurality of client devices based on a combination of one or more resource constraint values and the assessment of the respective perceptual quality level values, such that a combination of resulting quality levels satisfies a joint quality criterion.

20 Claims, 9 Drawing Sheets

(51) Int. Cl.
    *H04L 12/917*    (2013.01)
    *H04L 12/825*    (2013.01)
    *H04L 12/24*     (2006.01)
    *H04L 29/06*     (2006.01)
    *H04N 21/00*     (2011.01)
    *H04L 29/08*     (2006.01)
    *H04N 21/2343*   (2011.01)
    *H04N 21/24*     (2011.01)
    *H04N 21/6379*   (2011.01)

(52) U.S. Cl.
    CPC ..... *H04N 21/2401* (2013.01); *H04N 21/6379* (2013.01)

(56) References Cited

U.S. PATENT DOCUMENTS

| | | | | |
|---|---|---|---|---|
| 8,861,597 B2* | 10/2014 | Zhu | ............... | H04N 21/4113 375/240.1 |
| 9,351,340 B2* | 5/2016 | Ribeiro | ............... | H04W 99/00 |
| 9,565,127 B2* | 2/2017 | Pfeffer | ............... | H04L 47/822 |
| 2012/0297430 A1 | 11/2012 | Morgos et al. | | |
| 2013/0238790 A1* | 9/2013 | Gulati | ............... | G06F 11/00 709/224 |
| 2014/0321274 A1* | 10/2014 | Gahm | ............... | H04L 47/326 370/231 |
| 2015/0263987 A1* | 9/2015 | Klein | ............... | H04L 29/08 709/226 |
| 2016/0014040 A1* | 1/2016 | Dunne | ............... | G06F 9/00 709/226 |

OTHER PUBLICATIONS

Ding et al, "Quality-aware bandwidth allocation for scalable on-demand streaming in wireless networks," IEEE Journal on Selected Areas in Communications, IEEE Service Center, Apr. 2010, vol. 28, pp. 366-376, No. 3, Piscataway, US.

International Search Report and Written Opinion for PCT/US2015/041651 issued on Nov. 10, 2015.

* cited by examiner

JOINT QUALITY MANAGEMENT ACROSS MULTIPLE STREAMS

TECHNICAL FIELD

The present disclosure relates to data networks, and in particular, to joint resource allocation amongst multiple client devices based on data complexity and device status.

BACKGROUND

Increases in data-intensive video traffic signal both an enhancement of and a substitute for conventional broadcast cable access technologies. However, data-intensive video traffic can strain existing infrastructure and frustrate new infrastructure planning efforts because previously known network management methods do not consider user experience metrics. According to previously known network management methods a network is generally managed based on bandwidth utilization, with nominal levels of bandwidth allocated to client devices. Bandwidth allocations are often tied to a subscription tier model, where client devices in each tier receive a respective bandwidth allocation for a corresponding cost. While these known methods are convenient to administer, there are a number of unresolved problems.

One problem is that these methods do not account for the fact that perceptual playback quality can vary within a fixed allocation of bandwidth based on the complexity of media content data and client device resource constraints. That is, the respective perceptual playback qualities achieved by different client devices that are each allocated the same amount of bandwidth may be different based on the respective complexities of the media content and/or device resource constraints of each client device. Another problem is that bandwidth is inefficiently used and often fails to support sufficient playback quality of complex media content data. For example, as a result of statically providing client devices in the same tier the same amount of bandwidth, some client devices are provided with more bandwidth than needed to satisfy respective perceptual playback quality preferences, and other client devices are not provided enough bandwidth to satisfy respective perceptual playback quality preferences.

As such, network operators cannot adequately monitor and manage existing infrastructure, adequately plan new infrastructure deployments, or adequately constrain the operation of adaptive bit rate (ABR) enabled client devices that share network resources.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
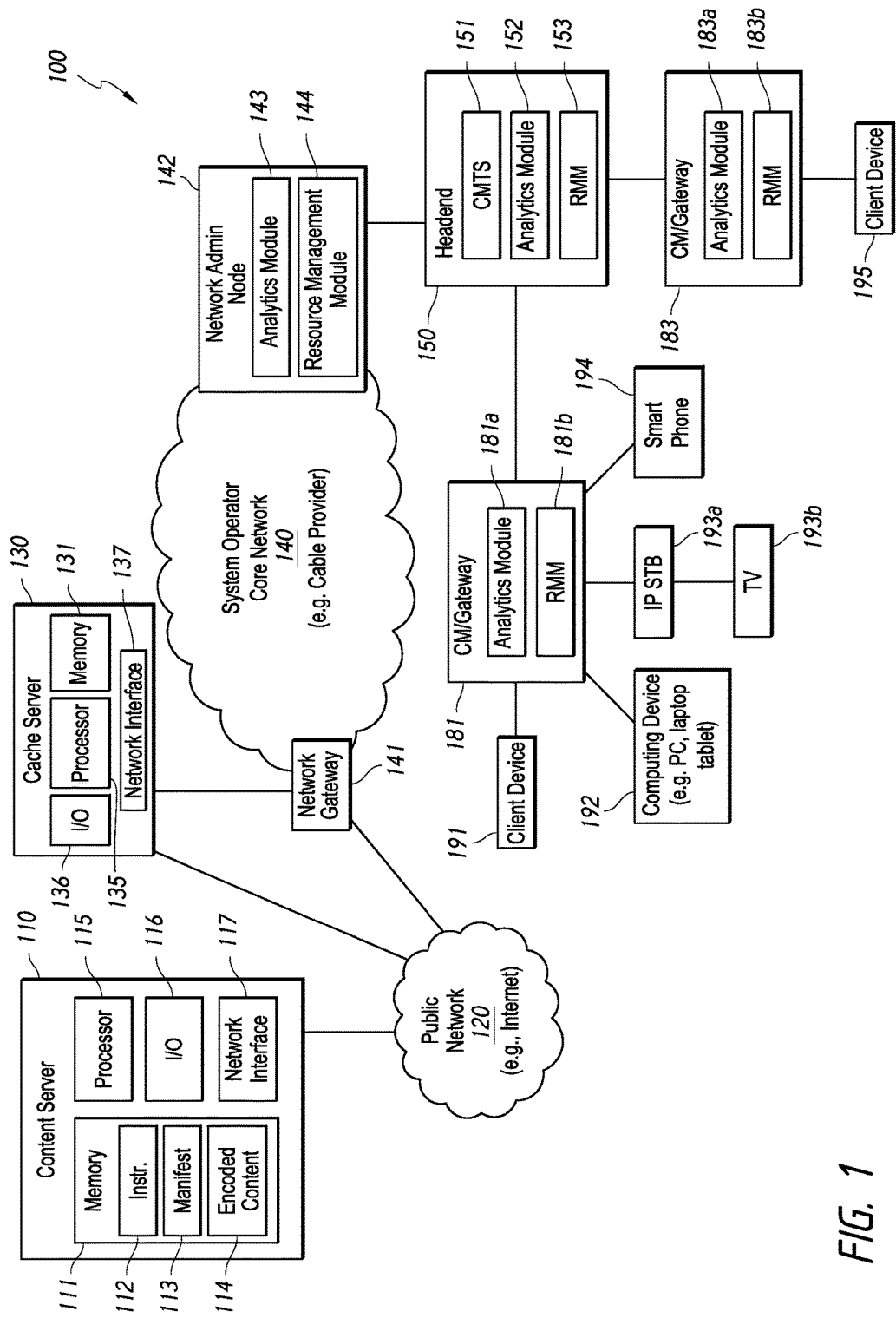
FIG. 1 is a block diagram of a data communication environment in accordance with some implementations.

In accordance with common practice various features shown in the drawings may not be drawn to scale, as the dimensions of various features may be arbitrarily expanded or reduced for clarity. Moreover, the drawings may not depict all of the aspects and/or variants of a given system, method or apparatus admitted by the specification. Finally, like reference numerals are used to denote like features throughout the figures.

DESCRIPTION

Numerous details are described herein in order to provide a thorough understanding of the illustrative implementations shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details described herein. Moreover, well-known systems, methods, components, devices and circuits have not been described in exhaustive detail so as not to unnecessarily obscure more pertinent aspects of the implementations described herein.

Overview

Previously known resource allocation methods ineffectively allocate shared network resources amongst client devices without regard to client-side perceptual playback quality and user experience issues. However, perceptual playback quality often widely varies within a fixed bandwidth allocation. In turn, some client devices are allocated more bandwidth than needed, while other client devices are not provided enough. By contrast, implementations disclosed herein enable a more efficient allocation of one or more shared network resources (e.g., bandwidth, processor time, memory, etc.) amongst a plurality of client devices based on media content complexity and client device resource status in order to better manage perceptual playback quality. In some implementations, a method includes obtaining a plurality of resource constraint values associated with a plurality of client devices sharing a network resource, and jointly determining a respective encoding rate level selection and a corresponding resource allocation for each of the plurality of client devices based on a combination of one or more resource constraint values and the assessment of the respective perceptual quality level values, such that a combination of resulting quality levels satisfies a joint quality criterion. More specifically, in some implementations, the method includes allocating portions of shared bandwidth to client devices based on respective video complexity metrics of segmented video data and at least one respective device resource constraint (e.g., buffer status) for each client device. In some implementations, the methods are based on a convex optimization framework that is flexible enough to accommodate a wide variety of video quality metrics.

FIG. 1 is a block diagram of a data communication environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the data communication environment 100 includes a public network 120 (e.g., a portion of the Internet), a system operator core network 140 (hereinafter "core network 140"), a content server 110, a cache server 130, and a headend node 150. The data communication environment 100 also includes subscriber gateway devices 181, 183 and a number of client devices 191, 192, 193a, 193b, 194, 195.

In some implementations, the core network 140 includes a private and/or subscription-based network. The core network 140 includes any LAN and/or WAN, such as an intranet, an extranet, a virtual private network, and/or portions of the Internet. In some implementations, the core network 140 provides communication capability between any one of the client devices 191, 192, 193a, 193b, 194, 195 and one or more third party service providers and/or content providers (e.g., content server 110, cache server 130, etc.). In some implementations, the core network 140 provides communication capability between any one of the client devices 191, 192, 193a, 193b, 194, 195 and one or more private content servers, storage devices, gateways and/or service servers (not shown), as well as core network provided services and content. In some implementations, the core network 140 uses HyperText Transport Protocol (HTTP) to transport information using the Transmission Control Protocol/Internet Protocol (TCP/IP). HTTP permits client devices to access various resources available via the core network 140 and/or the public network 120. However, implementations are not limited to the use of any particular protocol. One having ordinary skill in the art should understand that other networks distributing multimedia (e.g., video, graphics, audio, and/or data, or otherwise referred to also herein individually or collectively as media content or simply, content) may also benefit from certain embodiments of adaptive streaming systems and methods, and hence, are contemplated to be within the scope of the disclosure. The term "resource" in this specification refers to information, devices, infrastructure, and services. A resource includes, for example, bandwidth, processor time, data storage, data structures, non-transitory memory, images, video streams, network transactions, and computational objects. In various implementations, the core network 140 includes a combination of computing devices, switches, routers, server systems, enterprise memory, and data connections.

As shown in FIG. 1, in some implementations, the core network 140 includes a gateway node 141 that provides an interface for data communication external to the core network 140 (e.g., to the public network 120, the content server 110, the cache server 130, etc.). In some implementations, the gateway node 141 is provided as a single entity (e.g., a server, a virtual machine, etc.). In some implementations, the gateway node 141 is implemented as a distributed system including a suitable combination of software, data structures, virtual machines, computing devices, servers, switches and routers. For the sake of brevity and convenience of explanation, the gateway node 141 is described herein as a single entity.

The core network 140 also includes a network administration node 142 or the like, which is arranged to monitor and/or manage one or more headend nodes. Similar to the gateway node 141, the network administration node 142 is illustrated as single entity (e.g., a server, virtual machine, etc.) in FIG. 1. In various implementations, however, the network administration node 142 is provided as a distributed system including a suitable combination of software, data structures, virtual machines, computing devices, servers, switches and routers. Accordingly, the network administration node 142 is described herein as a single entity merely for the sake of brevity and convenience of explanation.

In some implementations, the network administration node 142 includes at least one of an analytics module 143 and a resource management module 144. In some implementations, the analytics module 143 is provided to obtain client device segment representation selections, associated perceptual playback quality values, and one or more device resource constraints for each of the client devices sharing the one or more shared network resources. As described below, the resource management module 144 is configured to enable network-centric concerted management of respective resource allocations provided to a plurality of client devices. In some implementations, respective resource allocations are determined to enable a more efficient allocation of one or more shared network resources, aimed at managing perceptual playback quality, amongst a plurality of client devices based on media content data complexity and client device resource constraints; and/or, to enable client devices to cooperatively participate in the allocation and consumption of the one or more network resources in order to produce more evenly distributed perceptual playback quality levels within each subscription tier. The respective levels of perceptual playback quality are managed by adjusting client device access to one or more shared network resources. In some implementations, the resource management module 144 is configured to jointly determine a respective encoding rate level and a corresponding resource allocation for each of the plurality of client devices based on a combination of one or more resource constraint values and the assessment of the respective perceptual quality level values, such that a combination of resulting quality levels satisfies a joint quality criterion. In some implementations, the resource management module 144 is configured to control the service rate (and/or other resource allocations) to client devices on a bottleneck link. In some implementations, per-client service rates are updated periodically. In some implementations, this is accomplished using network QoS features, such as weighted-fair-queuing (WFQ). The analytics module 143 and the resource management module 144 are not limited to implementation in or proximate to the network administration node 142. In various implementations, modules similar to one or both are included in headend nodes or other network bottleneck points. For example, in some implementations, modules similar to one or both are included in one or more of a mobile network, a mobile packet core, a WiF access point, a cable modem and a residential gateway device.

The headend node 150 is coupled to the network administration node 142 and/or one or more other portions of the core network 140. In some implementations, the headend node 150 is capable of data communication using the public network 120 and/or other private networks (not shown). Those of ordinary skill in the art will appreciate that a headend node is configured to deliver cable TV, cable modem services and/or various other data services to subscriber client devices. To that end, a typical headend node includes a suitable combination of software, data structures, virtual machines, routers, switches and high-availability servers. For example, the headend node 150 includes a cable modem termination server (CMTS) 151 that is used to service an allocation of bandwidth shared by a number of client devices. The CMTS 151 includes a suitable combination of hardware, software and firmware for terminating one or more data channels associated with a number of client devices within the shared allocation of bandwidth. In some implementations, the headend node 150 includes at least one of an analytics module 153 and a resource management module (RMM) 154. As described below with reference to FIG. 2, the analytics module 153 is configured to obtain a plurality of resource constraint values associated with a plurality of client devices sharing a network resource in order to each receive media content data, and encoding rate selections associated with the traffic on bandwidth available through and managed by the headend node 150. In some implementations, the resource management module 154 is configured to jointly determine a respective encoding rate level selection and a corresponding resource allocation for each of the plurality of client devices based on a combination of one or more resource constraint values and the assessment of the respective perceptual quality level values, such that a combination of resulting quality levels satisfies a joint quality criterion for a number of client devices that share one or more network resources available through the headend node 150. Further, while the analytics module 153 and the resource management module 154 are shown as distinct modules, in some implementations, some or all of the functions of each are incorporated into a CMTS or the like.

Client devices access network resources, services and content offerings from a respective headend node through subscriber gateway devices. For example, as shown in FIG. 1, the subscriber gateway devices 181, 183 are coupled to the headend node 150, and thus share bandwidth (and/or other resources) available through the headend node 150. In various implementations, a subscriber gateway device includes, without limitation, devices such as cable modems (CM), wireless access points, and Ethernet modems.

Each subscriber gateway device 181, 183 is accessible by and services a number of client devices. For example, the client device 195 is coupled to the subscriber gateway device 183. Similarly, the subscriber gateway device 181 is coupled to and delivers services and/or content to a client device 191, a computing device 192, a smartphone 194, and an IP set-top box (STB) 193a (which in turn is coupled to TV 193b). As such, the bandwidth allocated to the subscriber gateway device 181 is shared by four devices in the example shown. The bandwidth allocated to the subscriber gateway device 181 is also a portion of the available bandwidth provided by the headend node 150. The headend node 150 also provides bandwidth allocations to the subscriber gateway device 183, which services client device 195. Thus, in this example, the total bandwidth available from the headend node 150 is ultimately shared by five client devices 191, 192, 193a/b, 194, and 195. Those of ordinary skill in the art will appreciate from the present disclosure that, in various implementations, a headend node can be connected to any number and combination of gateway nodes and client devices, and FIG. 1 is merely an example provided to discuss aspects of various implementations.

In some implementations, a subscriber gateway device is configured to manage access and/or assist in the management of network resources available through the subscriber gateway device to corresponding client devices. To that end, for example, the subscriber gateway device 181 includes an analytics module 181a and a resource management module 181b. In the example shown in FIG. 1, the analytics module 181a and the resource management module 181b are provided, individually or in combination, to manage access or assist in the management of network resources available to the client devices 191, 192, 193a/b, and 194. In some implementations, each of the analytics module 181a and the resource management module 181b include one or more respective functions of the corresponding analytics modules 143, 152 and the resource management modules 144, 153 discussed above and below. Similarly, the subscriber gateway device 183 includes an analytics module 183a and a resource management module 183b.

With continued reference to FIG. 1, the content server 110 is configured to store and provide media content data. To that end, the content server 110 typically includes a non-transitory memory 111, a processor 115, an input-output (I/O) interface 116, and a network interface 117. The network interface 117 is configured to enable communication with other devices and systems, and for example, without limitation includes a modulator/demodulator (modem for communication with another device, system, or network), a radio frequency transceiver or another type of transceiver, a telephone interface, a bridge, a router, etc. In some implementations, the I/O interface 116 includes input devices, such as but not limited to, a keyboard, mouse, scanner, microphone, etc. The I/O interface 116 may also include output devices, such as but not limited to, a display, speakers, etc.

Figure 4:
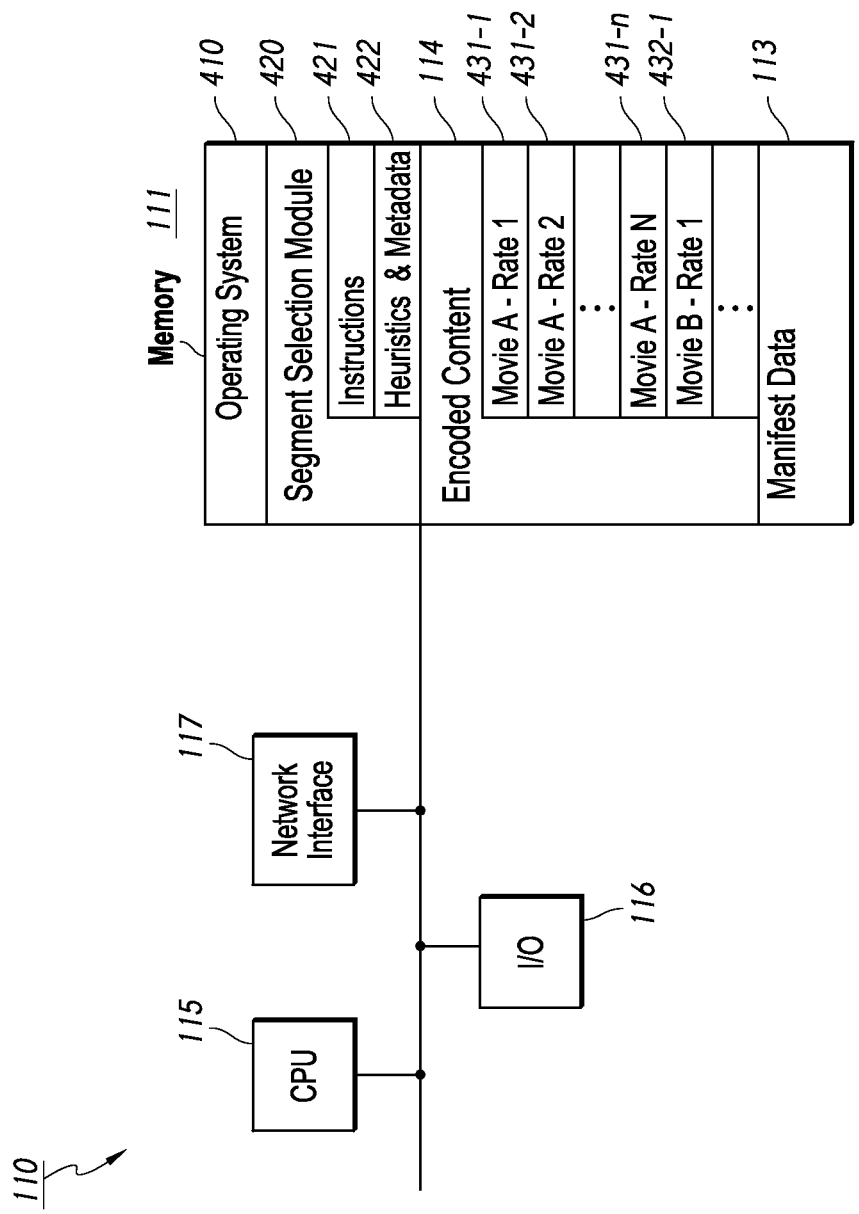
FIG. 4 is a block diagram of an example content server system in accordance with some implementations.

FIG. 4 is a block diagram of an example implementation of the content server system 110 of FIG. 1A in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the content server system 110 includes one or more processing units (CPU's) 115, a network interface 117, a memory 111, and a local I/O interface 116. The memory 111 includes an operating system 410, which includes implementations of procedures for handling various basic system services and for performing hardware dependent tasks.

With reference to FIGS. 1 and 4, the memory 111 includes instructions 112 (421 in FIG. 4), a manifest 113 and encoded media content data 114. With reference to FIG. 1, in some implementations, the instructions 112 enable the selection of one or more encoding rate representations and/or one or more temporal segments of a media content data item in response to a request from a client device. With reference to FIG. 4, in some implementations the content server 110 also includes a segment selection module 420. The segment selection module 420 includes instructions 421 and heuristics and metadata 421. In some implementations, the instructions 421 in combination with the heuristics and metadata 421 enable the selection of one or more encoding rate representations and/or one or more temporal segments of a media content data item in response to a request from a client device. In some implementations, the encoded media content data 114 includes multiple representations of each of one or more media content data items. As an example, as shown in FIG. 4, the encoded media content data 114 includes data representing two movies, namely Movie A and Movie B, as example media content data items. Those of ordinary skill in the art will appreciate from the present disclosure that various other types of media content data include without limitation sports video, newscasts, music and concert videos, and various other types of TV programs, audio files and video games. Encoded content 114 includes multiple representations 431-1, 431-2, . . . , 431-n of Movie A, that are each encoded at a different bit rate than the other representations. Similarly, one of many representations of Movie B, indicated by 432-1, is also illustrated in furtherance of the example. In some implementations, a representation of a media content data item is divided into one or more temporal segments, each of which is available at one or more encoding rates. In some implementations, the manifest 113 includes metadata associated with each of the encoding rate representations and/or the temporal segments of the one or more media content data items. For example, the manifest 113 includes at least one of a respective encoding rate indicator, a quality level indicator, and a duration indicator for each representation of the one or more media content data items. In some implementations, as described below with reference to FIG. 2, a quality level indicator is explicitly indicated (e.g., as opposed to being inferred from the encoding bit rate), with the explicit indication corresponding to a perceptual playback quality metric such as mean square error (MSE), peak signal-to-noise ratio (PSNR), mean opinion score (MOS), relative degradation, an encoding quantization parameter or other well-known quality metrics. In some implementations, a quality level indicator includes a respective QoE metric associated with a temporal segment of a representation of a media content data item, characterized by a particular encoding rate.

The cache server 130 is configured to provide replicas of at least some of the media content data and associated metadata stored and provided by the content server 110. In various implementations, the cache server 130 is similarly configured to the content server 110, and includes, without limitation, a processor 135, a non-transitory memory 131, a network interface 137, and I/O interface 136. In some implementations, a request for media content data item from a client device is initially directed to or redirected to the cache server 130, when the cache server 130 is closer to the client device than the content server 100. The cache server 130 can also be used to supplement the content server 110 during times of excessive traffic.

Although FIG. 1 illustrates a number of discrete elements, FIG. 1 is intended to highlight various aspects of a network rather than to serve as a schematic strictly indicative of various network implementations. Thus, in various implementations, a network includes a subset or superset of the elements illustrated in FIG. 1. As such, a combination of elements could be implemented by a single element and some singular elements could be implemented by one or more elements. The number of elements and how various features and functions are allocated can vary between implementations, and may depend in part on the amount of traffic a network is configured to handle during various usage periods (e.g., peak, average, low, etc.).

In operation, various encoding rate representations of media content data items can be provided to client devices (e.g., client device 191) in a number of ways. For example, in HTTP-based adaptive streaming (HAS) and in ABR-enabled systems, a media content item (e.g., a particular movie, sportscast, etc.) is typically sub-divided into temporal segments (e.g., 2-10 seconds long). Often each temporal segment is encoded at multiple bit rates in order to provide each temporal segment at different perceptual playback quality levels. To that end, multiple representations of each segment are stored and made available by the content server 110 to client devices. The encoding bit rate of each segment representation in part characterizes the perceptual playback quality of the segment representation. Since each representation of a segment is encoded at a different bit rate, each representation has a different amount of data, and thus uses a different combination of bandwidth and/or time for transmission. A variety of storage structures can be used for ABR media content data, such as directories with individual files for each segment, standardized file formats, and/or custom packaging schemes. In some implementations, the structure of the media content data, along with associated metadata associated with each segment, is contained in a separate structure, referred to above as a manifest (e.g., manifest data 113 in FIGS. 1 and 4). In some implementations, manifest data 113 also includes a respective quality level indicator that explicitly indicates the perceptual playback quality of each segment representation. More specifically, in some implementations, a quality level indicator provides a quantitative characterization of the perceptual playback quality of a segment representation for a client device that has the playback capability to achieve the indicated level of quality. As noted above, various quality level indicators include, without limitation, metrics such as mean square error (MSE), peak signal-to-noise ratio (PSNR), mean opinion score (MOS), relative degradation, an encoding quantization parameter or other well-known quality metrics.

An ABR-enabled client device selects and transmits a request (e.g., a HTTP GET command) for a specific segment representation from the content server 110. The selection decision is based on various parameters including the subscription tier bandwidth allocated to the client device and the amount of data currently residing in a playout buffer of the client device. Previously known ABR client device methods have a general bias towards enabling a client device to consume as much bandwidth as is available to the client device in order to increase utilization of bandwidth and/or other resources. In turn, an ABR-enabled client device typically operates to select segments representations with high encoding rates so that the client device consumes as much of the bandwidth allocated to it as possible. A typical ABR-enabled client device is also biased towards consuming bandwidth in excess of its subscription tier allocation when additional bandwidth becomes available from the network.

A drawback of these methods is that they do not consider or determine whether actual perceptual quality of experience improvements, if any, achieved by an ABR-enabled client device justify the bias towards consuming available bandwidth. For example, a client device may select a 10 Mbps representation of a video stream segment over a 6 Mbps representation of the same video stream segment. However, depending on the content of the video stream segment (e.g., a movie scene with fast moving action versus a scene with mainly dialogue and little movement), the end user may not perceive an appreciable difference in playback quality. Without such an appreciable difference, the additional 4 Mbps bandwidth (or equivalently time) used to receive the 10 Mbps segment representation is misused, and could be utilized more productively. Additionally, a specified level of perceptual playback quality for a segment representation is often based on the playback capability of a client device. So for example, a first client device may only be capable of displaying video at a resolution of 720p, while a second client device is capable displaying video at a resolution of 1080p. If the first client device is not prevented from selecting the higher rate representation (for 1080p), as would be the cased with an ABR-enabled client device, the first client device would effectively misuse or misappropriate bandwidth from the second client device and/or other client devices by selecting the higher rate representation.

By contrast, as provided by some implementations, a more effective use of available bandwidth includes limiting the first client device to a segment representation with a resolution of 720p, because the difference in playback quality cannot be realized on the first client device. To that end, more generally, various implementations enable client devices to cooperatively participate in the allocation and consumption of the one or more network resources in order to produce more evenly distributed perceptual playback quality levels among client devices within each subscription tier. For example, some implementations include a method of jointly determining a respective resource allocation and a corresponding bit-rate representation selection for each of a plurality of client devices such that a combination of resulting quality levels for the plurality of client devices satisfies a joint quality criterion.

For example, first and second client devices are allocated respective bandwidth allocations over a shared link by a resource management module (e.g., resource management module 153). The first and second client devices are configured to operate within the respective bandwidth allocations, and are configured to request content streams at bit rates such that each stream does not exceed the respective bandwidth allocation. The first and second client devices are each initially assigned respective bandwidth allocations of 4 Mbps on a shared link having a total of 8 Mbps bandwidth. In furtherance of this example, the first client device is operating to receive a sports video stream (i.e., characterized by rapid pixel changes), and the second client device is operating to receive a newscast video stream (i.e., characterized by slow pixel changes). The sports video stream may be available at three bit rates, 8 Mbps stream with good quality video, 6 Mbps with acceptable quality video, and 4 Mbps stream with poor quality video. The newscast video stream may also be available in four bit rates, 8 Mbps stream with excellent quality video, 6 Mbps stream with excellent video quality (the 8 Mbps stream being insubstantially better than 6 Mbps stream in terms of quality), 4 Mbps stream with good quality video, and 2 Mbps with acceptable quality video. In accordance with some implementations, the first and second devices are provided with respective bandwidth allocations and segment representations (of the client selected media content) at network-selected encoding rate levels that satisfy a joint quality criterion for both the first and second devices. The network-selected segment representations may or may not match the segment representations initially selected by one or more of the plurality of client devices. In some implementations, a resource controller or the like is configured to exert less control, and signals client devices when there is a segment representation selection mismatch, which enables the client devices to make the final decision. However, in some implementations, a client device is prevented from overriding the network selection when the encoding rate of a segment representation selected by a client device is outside of a tolerance value. For example, in some implementations, the tolerance value is one of a percentage and an absolute value. If the client device selected segment representation has an encoding rate that breaches the tolerance value, then the resource controller overrides the client device selection.

Figure 2:
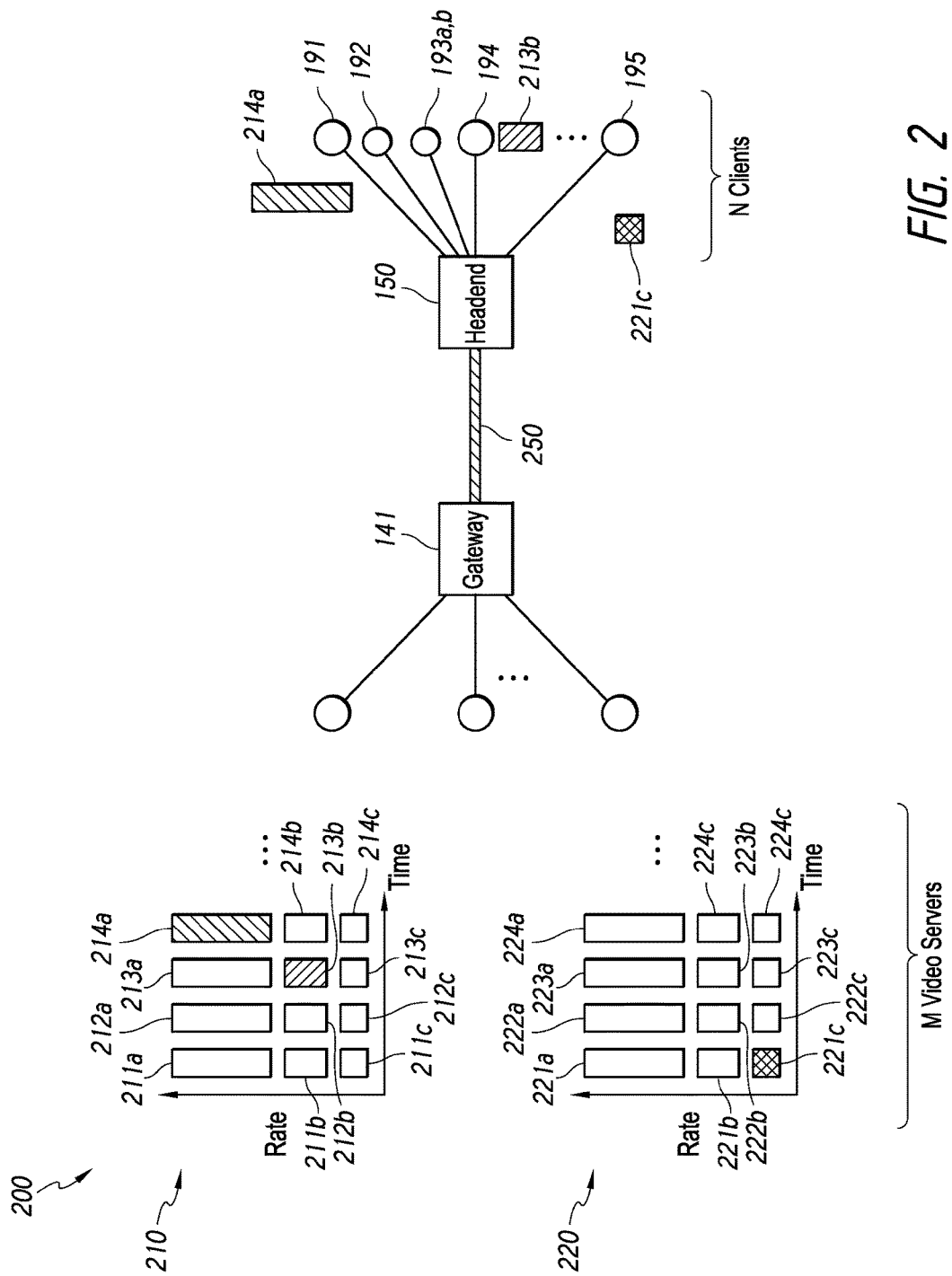
FIG. 2 is a block diagram of a data link congestion model in accordance with some implementations.

FIG. 2 is a block diagram of a data link congestion model 200 that further illustrates the issues described above. The data link congestion model 200 shown in FIG. 2 is similar to an adapted from the data communication environment 100 provided in FIG. 1. Elements common to FIGS. 1 and 2 include common reference numbers, and only the differences between FIGS. 1 and 2 are described herein for the sake of brevity. To that end, the congestion model 200 includes a bottleneck link 250 providing a shared allocation of bandwidth between the gateway node 141 and headend node 150. The headend node 150 is ultimately coupled to the five client devices 191, 192, 193a/b, 194 and 195. Thus, in this example, the total bandwidth available through the headend node 150 on bottleneck link 250 is ultimately shared by the five client devices 191, 192, 193a/b, 194 and 195.

The congestion model 200 in FIG. 2 also includes first and second media content data items 210, 220 stored at M video servers (not shown). The first media content data item 210 includes a first set of segment representations 211a,b,c, a second set of segment representations 212a,b,c, a third set of segment representations 213a,b,c, and a fourth set of segment representations 214a,b,c. The first set of segment representations 211a,b,c includes segment representations for a first temporal segment of the first media content data item 210. Similarly, the second, third and fourth sets of segment representations (212a,b,c, 213a,b,c, 214a,b,c) are for respective second, third and fourth temporal segments of the first media content data item 210. The second media content data item 220 includes a first set of segment representations 221a,b,c, a second set of segment representations 222a,b,c, a third set of segment representations 223a,b,c, and a fourth set of segment representations 224a,b,c. The first, second, third and fourth sets of segment representations (221a,b,c, 222a,b,c, 223a,b,c, 224a,b,c) are for respective first, second, third and fourth temporal segments of the second media content data item 220.

In operation, the five client devices 191, 192, 193a/b, 194 and 195 are each able to select segment representations. In some implementations, a client device selects a temporal segment based on a respective portion of the bandwidth on bottleneck link 250 allocated to the client device. For example, as shown in FIG. 2, the client device 191 selects segment representation 214a, corresponding to the highest encoding rate available for the fourth temporal segment of the first media content data item 210. The client device 194 selects segment representation 213b, corresponding to the middle encoding rate available for the third temporal segment of the first media content data item 210. And, the client device 195 selects segment representation 221c, corresponding to the middle encoding rate available for the third temporal segment of the second media content data item 220. Additionally, in ABR-enabled implementations, a client device is able to exceed the bandwidth allocated to it when other portions of the bandwidth on bottleneck link 250 are underutilized, and thus select segment representations with higher encoding rates that are normally supported by the bandwidth nominally allocation to the client device.

Client devices generally include any suitable computing device, such as a computer, a laptop computer, a tablet device, a netbook, an internet kiosk, a personal digital assistant, a mobile phone, a smartphone, a gaming device, a computer server, etc. In some implementations, each client device includes one or more processors, one or more types of memory, a display and/or other user interface components such as a keyboard, a touch screen display, a mouse, a track-pad, a digital camera and/or any number of supplemental devices to add functionality. As an example, FIG. 3, a block diagram of a configuration of a client device 300 in accordance with some implementations. While pertinent features are illustrated, those of ordinary skill in the art will appreciate from the present disclosure that various other features have not been illustrated for the sake of brevity and so as not to obscure more pertinent aspects of the example implementations disclosed herein.

In some implementations, the client device includes a suitable combination of hardware, software and firmware configured to provide at least some of protocol processing, modulation, demodulation, data buffering, power control, routing, switching, clock recovery, amplification, decoding, and error control. In some implementations, at least a portion of the control module and at least a portion of the plurality of optical communication devices are provided on a first substrate. For example, the client device 300 includes a communication interface 302. In some implementations, the communication interface 302 is suitable for communication over, among others, an IP network, a coaxial cable network, an HFC network, and/or wireless network. The communication interface 302 is coupled to a demultiplexer (demux) 304. The demux 304 is configured to parse the metadata (e.g., in the packet header or in the manifest) of segment representations and the body or payload data of the same. Metadata includes, for example, timestamp information, packet identifiers, program numbers, quality level, and/or other information useful for decoding and utilizing a received segment representation. The segment data and metadata information is provided to a media engine 306 as explained further below.

Although client device 300 is described in the context of various internet video streaming implementations, such as IPTV and VoD, the client device 300 may comprise additional and/or different components in various other implementations. For instance, in some implementations, the client device 300 includes a tuner system (e.g., radio frequency tuning, not shown) coupled to communication interface 302. In some implementations, a tuner system includes one or more tuners for receiving transport streams received via communication interface 302. Additionally and/or alternatively, in some implementations, a demodulator is employed to demodulate the received carrier signal and the demux 304 is configured to parse the transport stream packets of one or more defined carrier frequencies.

Figure 3:
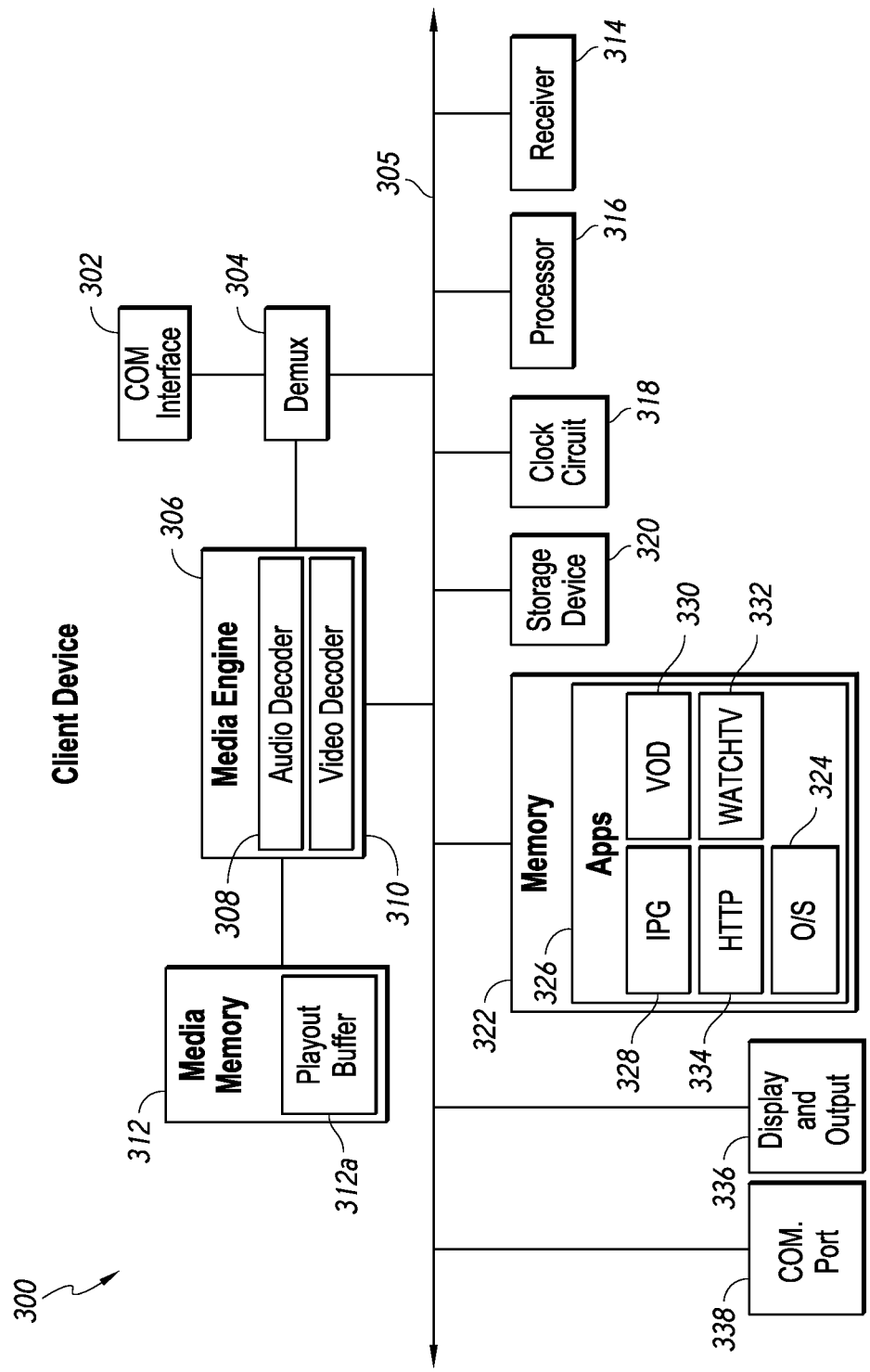
FIG. 3 is a block diagram of an example of a client device in accordance with some implementations.

As shown in FIG. 3, the demux 304 is coupled to a bus 305 and to media engine 306 (i.e. an audio/video (A/V) processing or decoding device). The media engine 306 includes decoding logic including, for example, at least one of an audio decoder 308 and a video decoder 310. The media engine 306 also includes buffer management functionality to facilitate a determination as to current buffer level within the client device 300. The media engine 306 is further coupled to bus 305 and to a media memory 312. The media memory 312 includes one or more buffers (e.g. playout buffers) for temporarily storing compressed and/or reconstructed pictures and/or audio frames. In some implementations, the buffers of media memory 312 and/or other buffers (e.g., network buffers) reside in other memory devices, or distributed among media memory 312 and memory 322.

In some implementations, the client device 300 includes additional components coupled to bus 305. For example, the client device 300 also includes a receiver 314 configured to receive user input. In some implementations, the client device 300 includes a processor 316 for executing and managing operations of the client device 300. In some implementations, the client device 300 includes a clock circuit 318 comprising phase and/or frequency locked-loop circuitry (or software, or combination of hardware and software) configured to synchronize clock information received in an audio, video, or A/V stream to facilitate decoding operations and to clock the output of reconstructed audiovisual content.

In some implementations, the client device 300 also includes a storage device 320 (and associated control logic) provided to temporarily store buffered content and/or to more permanently store recorded content. The memory 322 includes at least one of volatile and/or non-volatile memory, and is configured to store executable instructions or computer code associated with an operating system (O/S) 324, one or more applications 326 (e.g., an interactive programming guide (IPG) 328, a video-on-demand (VoD) app 330, a WatchTV app 332 (associated with broadcast network TV), HTTP logic 334, among other applications such as pay-per-view, music, personal video recording (PVR), driver software, etc. In some implementations, profile selection logic includes HTTP client functionality, and may generate requests for segment representation from a content server (e.g., content server 110).

The client device 300 may be further configured with display and output logic 336, as indicated above that may include graphics and video processing pipelines, among other circuitry to process the decoded pictures and associated audio and provide for presentation (e.g., display) on, or associated with, a display device or other media device. Communications port 338 (or ports) may further be included in the client device 300 for receiving information from and transmitting information to other devices. For instance, communication port 338 may feature USB (Universal Serial Bus), Ethernet, IEEE-1394, serial, and/or parallel ports, etc. In addition, communications port 338 may be configured for home networks (e.g., HPNA/MoCA, etc.). The client device 300 may also include an analog video input port for receiving analog video signals.

Figure 5:
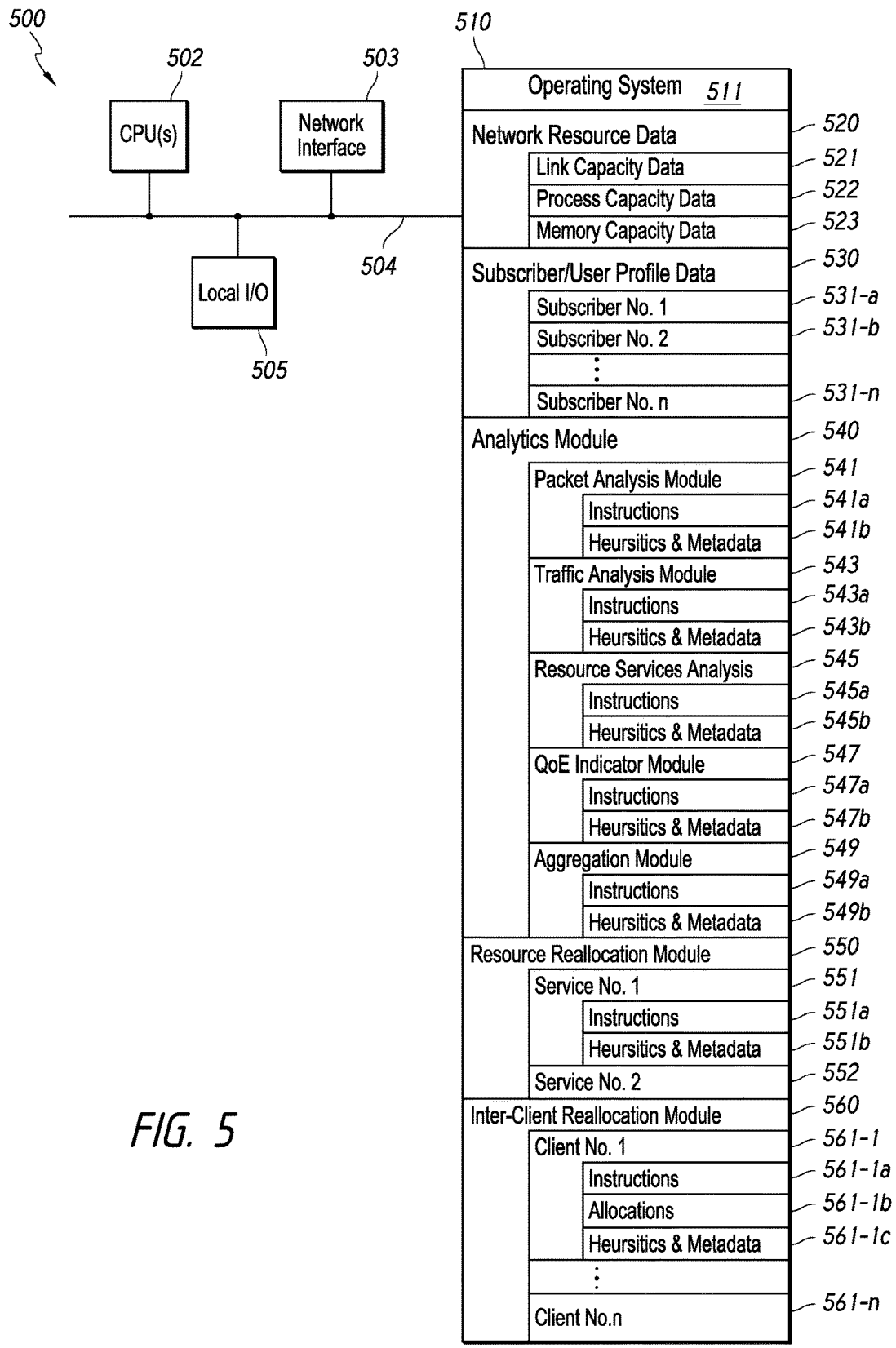
FIG. 5 is a block diagram of an example of a network resource management system in accordance with some implementations.

FIG. 5 is a block diagram of an example of a resource management system 500 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. As a non-limiting example, in some implementations the resource management system 500 includes one or more processing units (CPU's) 502, network interface 503, memory 510, local I/O interface 505, and one or more communication buses 504 interconnecting the aforementioned and other components.

In some implementations, the communication buses 504 include circuitry that interconnects and controls communications between system components. The memory 510 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 510 optionally includes one or more storage devices remotely located from the CPU(s) 502. The memory 510 comprises a non-transitory computer readable storage medium. Moreover, in some implementations, the memory 510 or the non-transitory computer readable storage medium of the memory 510 stores the following programs, modules and data structures, or a subset thereof including an optional operating system 511, network resource data 520, subscriber/user profile data 530, an analytics module 540, a resource reallocation module 550, and an inter-client reallocation module 560.

The operating system 511 includes procedures for handling various basic system services and for performing hardware dependent tasks.

In some implementations, the network resource data 520 includes data associated with one or more shared network resources (e.g., bandwidth, processor time, memory, etc.). For example, as shown in FIG. 5, in some implementations, the network resource data 520 includes link capacity data 521, processor capacity data 522, and memory capacity data 523. In some implementations, the subscriber/user profile data 530 includes data associated with one or more subscriber gateway devices and/or subscriber client devices. For example, in some implementations, the subscriber/user profile data 530 includes subscriber policy limits for various client devices 531-a, 531b, . . . , 531-n. In some implementations, the subscriber policy limits and the like include the various levels of service that define a subscription tier model. For example, service levels define priority tiers, data throughput ranges, data throughput floors or ceilings, and degradation policies associated with the subscription tier model.

In some implementations, the analytics module 540 is configured to obtain client device segment representation selections, associated perceptual playback quality values, and one or more device resource constraints for each of the client devices sharing the one or more shared network resources as described above. As shown in FIG. 5, the analytics module 540 includes a packet analysis module 541, a traffic analysis module 543, a resource services analysis module 545, a QoE indicator module 547, and an aggregation module 549. In some implementations, the packet analysis module 541 is configured to perform deep packet inspection of packets sent to and/or from client devices in order to determine at least one of client device segment representation selections, encoding rates of segment representations, and QoE indicator values. To that end, the packet analysis module 541 includes instructions 541a, and heuristics and metadata 541b. In some implementations, the traffic analysis module 543 is configured to monitor network traffic to and/or from client devices in order to generate resource allocation utilization values for corresponding client devices and/or subscriber gateways. Additionally and/or alternatively, in some implementations, the traffic analysis module 543 is configured to request and receive resource allocation utilization values from at least some client devices and/or subscriber gateways. To that end, the traffic analysis module 543 includes instructions 543a, and heuristics and metadata 543b. In some implementations, the resource services analysis module 545 is configured to determine relative resource utilization values for resource allocations provided for corresponding services. To that end, the resource services analysis module 545 includes instructions 545a, and heuristics and metadata 545b. In some implementations, the QoE indicator module 547 is configured to assess QoE levels from a number of client devices sharing a network resource. For example, in some implementations, the QoE indicator module 547 is configured to produce one or more QoE distribution indicator values that characterize at least in part the relative QoE values associated with a plurality of client devices sharing a network resource as described below with reference to FIG. 8. To that end, the QoE indicator module 547 includes instructions 547a, and heuristics and metadata 547b. In some implementations, the aggregation module 549 is configured to determine aggregate QoE values and/or one or more QoE distribution indicator values. To that end, the aggregation module 549 includes instructions 549a, and heuristics and metadata 549b.

In some implementations, the resource reallocation module 550 is configured to manage the reallocation of a network resource between two or more services provided to two or more respective groups of client devices and/or subscriber gateway devices as described below with reference to FIGS. 8 and 9. In some implementations, the resource reallocation module 550 includes a respective sub-module to manage each service. For example, as shown in FIG. 5, the resource reallocation module 550 includes a first service sub-module 551 and a second service sub-module 552. Each service sub-module includes instructions and/or heuristics and metadata. For example, as shown in FIG. 5, the first service sub-module 551 includes instructions 551a, and heuristics and metadata 551b.

In some implementations, the inter-client reallocation module 560 is configured to manage the reallocation of network resources between two or more groups of client devices and/or groups of subscriber gateway devices. In some implementations, the inter-client reallocation module 560 includes a sub-module to manage each of the two or more groups of client devices and/or groups of subscriber gateway devices. For example, as shown in FIG. 5, the inter-client reallocation module 560 includes client device sub-modules 561-1, . . . , 561-n. Each client device sub-module includes instructions, resource allocation data and/or heuristics and metadata. For example, the first client device sub-module 561-1 includes instructions 561-1a, allocation data 561-1b, and heuristics and metadata 561-1c.

With further reference to the data link congestion model 200 of FIG. 2, aspects of an example implementation are described and generalized hereinafter in the context of cable networks. As described above, the headend node 150 manages access to the bottleneck link 250 for a number of client devices 191, 192, 193a/b, 194 and 195. In many cable networks, a headend node is configured to deliver cable TV, cable modem services and/or various other data services to multiple homes (i.e., client sites) that each include a respective cable modem. Within each home, a portion of the bottleneck link at the ingress of the cable modem is often further shared among multiple HTTP video streams, bearing different content for various devices. In some implementations, the headend node 150 is configured to control the service rate to each cable modem. In some implementations, the headend node 150 is configured to control the per-stream service provided to each client device coupled to a cable modem.

In some implementations, the headend node 150 is configured to make per-stream decisions for a number of client device and cable modem combinations in a centralized manner. For example, the headend node 150 is configured to manage N video streams sharing a bottleneck link (e.g., the bottleneck link 250) having a corresponding total of capacity C. The headend node 150 is configured to update the bandwidth allocation to each stream on a periodic basis (e.g., once per time slot, Δt) or in response to at least one of a network condition, network event and change in demand from one or more client devices. In some implementations, the method is temporally constrained by a time horizon T, such that T/Δt slots are managed during one iteration of the method.

At time t, the $i^{th}$ stream (i.e., for the $i^{th}$ client device) is assigned a bandwidth allocation of $c_{i,t}$. In some implementations, as shown in equation (1) below, the summation of bandwidth allocations assigned to all streams is constrained to remain below the capacity C of the bottleneck link 250.

$$\Sigma_i c_{i,t} < C, \forall t \tag{1}$$

As described above, an ABR-enabled client device is configured to request and download/receive bit-rate encoded representations of media content (e.g., video) on a per segment basis. Generally, for each segment representation selection, an ABR-enabled client device selects from K different available encoding bit-rate segment representations associated with different quality levels. Merely for notational convenience, a segment representation duration is denoted by $\tau$. The set of available rates $R_{i,m}$ for the $m^{th}$ segment representations for the $i^{th}$ client is provided by equation (2) as follows:

$$R_{i,m} = \{r_{i,m}^{(1)}, \ldots r_{i,m}^{(k)}, \ldots r_{i,m}^{(K)}\} \quad (2)$$

A respective set of video quality values $Q_{i,m}$ corresponding to the set of available rates $R_{i,m}$ for the $m^{th}$ segment representations is provided by equation (3):

$$Q_{i,m} = \{q_{i,m}^{(1)}, \ldots q_{i,m}^{(k)}, \ldots q_{i,m}^{(K)}\} \quad (3)$$

In some implementations, mean-square error (MSE) distortion is used to characterize the video quality metric because MSE distortion is often mathematically tractable. Equation (4) provides a representation for a set of encoded video distortions $D_{i,m}$ corresponding to the set of available rates $R_{i,m}$ for the $m^{th}$ segment representations.

$$D_{i,m} = \{d_{i,m}^{(1)}, \ldots d_{i,m}^{(k)}, \ldots d_{i,m}^{(K)}\} \quad (4)$$

In some implementations, improving video quality Q is correlated with reducing MSE distortion D. However, the disclosed framework is general enough to accommodate other video quality metrics, including peak-signal-to-noise-ratio (PSNR), structure-similarity-index, and subjective mean opinion-score (MOS) when such information is available. Accordingly, those of ordinary skill in the art will appreciate that an implementation based on reducing MSE distortion is described herein merely for the sake of example.

Merely for notational convenience, $d_{i,m}(\bullet)$ is used to denote an empirical rate-distortion function for the $m^{th}$ segment representation in the $i^{th}$ stream. In other words, $d_{i,m}(r) = d_{i,m}^{(k)}$ for $r = r_{i,m}^{(k)}$. In some implementations, a parametric model is used to fit each rate distortion curve, as shown in accordance with equation (5) as follows:

$$d(r) = d_0 + \frac{\theta}{r - r_0} \quad (5)$$

With reference to equation (5), $\theta$, $d_0$ and $r_0$ are model parameters. In this particular implementation, the model parameter $\theta$ indicates scene and motion complexity of a video segment, $d_0$ indicates the distortion offset when a video segment is encoded at high rate, and $r_0$ indicates a rate offset. The values of these parameters can be obtained via non-linear regression methods from empirical rate-distortion data for each segment. Moreover, while a particular parametric model is characterized by equation (5), in various implementations, other various parametric models are utilized that are continuous and convex in form.

Figure 6:
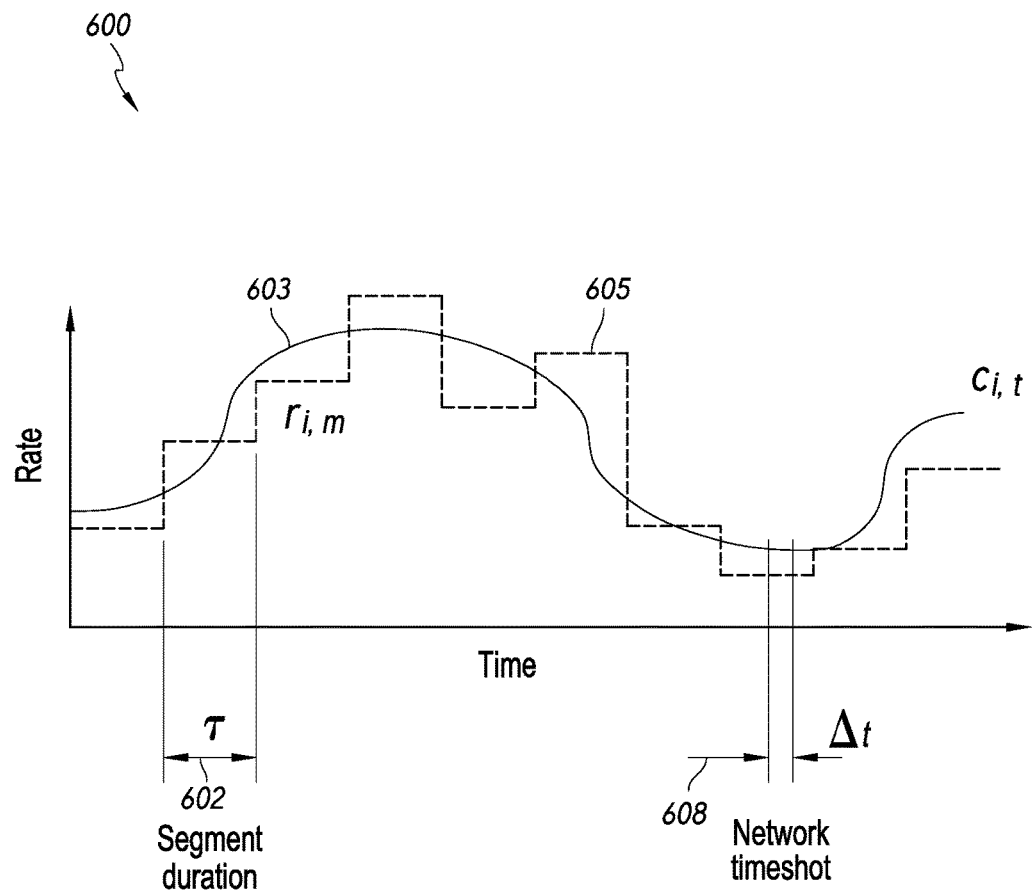
FIG. 6 is a performance diagram of time-varying bandwidth allocation for a single client device in accordance with some implementations.

With continued reference to the data link congestion model 200 of FIG. 2, FIG. 6 is a performance diagram 600 showing the time-varying bandwidth allocation 603 $\{c_{i,t}\}$ and time-varying segment representation selections 605 $\{r_{i,t}\}$ for a single client device in accordance with some implementations. In the example shown in FIG. 6, the duration of a segment representation (i.e., segment duration $\tau$) 602 is greater than the time slot duration 608, $\Delta t$, used to update bandwidth allocations. However, those of ordinary skill in the art will appreciate from the present disclosure that in various implementations the duration of a segment representation, $\tau$, is less than, greater than, or equal to time slot duration, $\Delta t$.

With continued reference to FIGS. 2 and 6, an estimate of the cumulative data downloaded (or received) $s_{i,t}$ by the $i^{th}$ client device is provided by equation (6a) as follows:

$$s_{i,t} = b_i^0 + \Sigma_{t'=0}^{t} c_{i,t'} \Delta t \quad (6a)$$

Additionally, an estimate of the cumulative data consumed $l_{i,t}$ from the playout buffer of the $i^{th}$ client device is provided by equation (6b) as follows:

$$l_{i,t} = \sum_{m': t_i^0 + m'\tau < t} r_{i,m'} \tau \quad (6b)$$

With reference to equations (6a) and (6b) the initial playout buffer size is denoted by $b_i^0$ and the playout latency of the $i^{th}$ client device is denoted by $t_i^0$. Consideration of the initial playout buffer size $b_i^0$ allows a network controller (e.g., a headend node 150) to take into account that the $i^{th}$ client device has a non-empty buffer, and will and/or can in turn wait for duration $t_i^0$ before viewing a first segment representation of a media content item (e.g., streaming video).

In some implementations, the cumulative data being downloaded $s_{i,t}$ and the cumulative data consumed $l_{i,t}$ are constrained relative to one another in order to avoid playout buffer underflow at the $i^{th}$ client device. For example, in some implementations, this constraint is represented by equation (7) as follows:

$$s_{i,t} \geq l_{i,t}, \forall i, \forall t \quad (7)$$

The example constraint provided by equation (7) may be tight when the $i^{th}$ client device has just finished playing out a received segment representation (i.e., $t = t_i^0 + m\tau, \forall m = 1, \ldots, M$). In other words, the example constraint provided by equation (7) can be tight at times, indicating that the playout buffer of the $i^{th}$ client device is almost empty, such as when the $i^{th}$ client device has just finished playing out a received segment representation.

In some implementations involving live streaming scenarios, the client devices are further constrained in the number of segments they are permitted to request in advance. This, accordingly, translates into another set of linear constraints provided by equation (8) as follows:

$$s_{i,t} \leq l_{i,t}^U, \forall i, \forall t \quad (8)$$

Here, $l_{i,t}^U = l_{i,t - m_0 \tau}$, where $m_0$ is the number of video segments within the look-ahead horizon, T.

Figure 7:
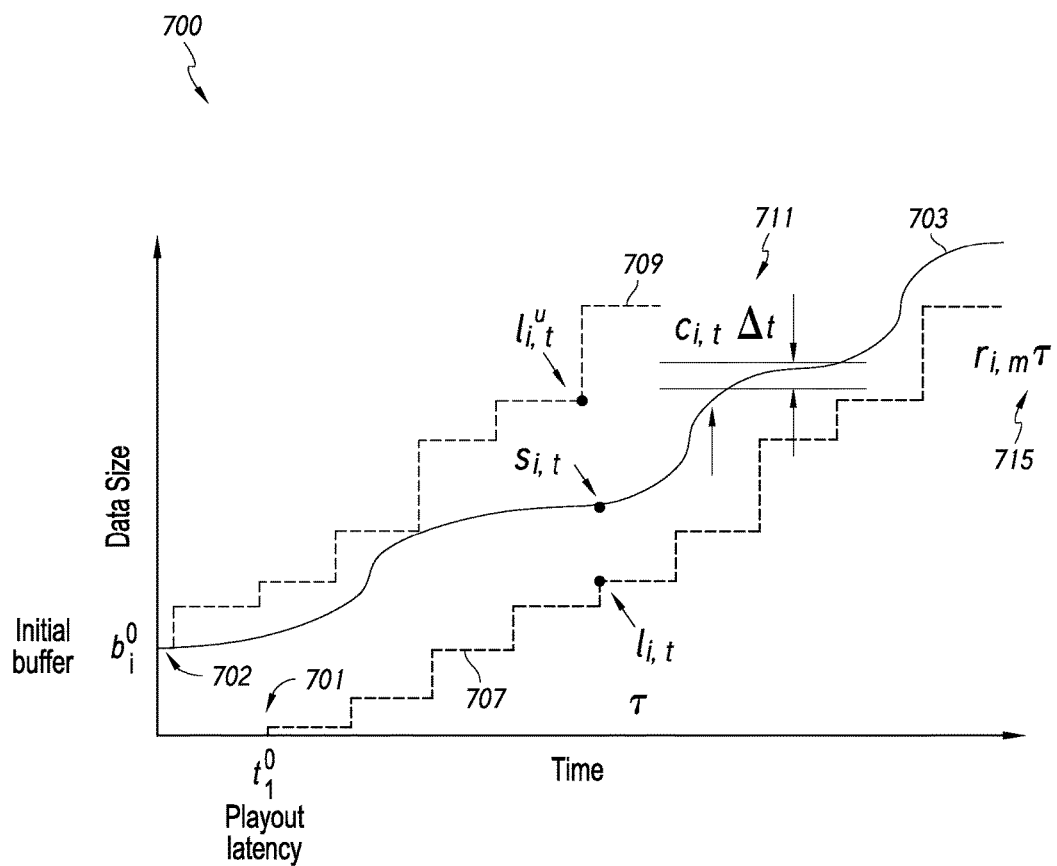
FIG. 7 is a performance diagram of a cumulative playout buffer evolution for a single client device in accordance with some implementations.

FIG. 7 is a performance diagram 700 of a cumulative playout buffer evolution for a single client device in accordance with some implementations. Specifically, FIG. 7 shows that the evolution of the cumulative data downloaded (or received) $s_{i,t}$ by the $i^{th}$ client device extends along path 703 from an initial playout buffer size ($b_i^0$) 702. An estimate of the data downloaded/received 711 in a slot duration, $\Delta t$, is provided by the product of $c_{i,t}$ and $\Delta t$. The cumulative data consumed $l_{i,t}$ from the playout buffer of the $i^{th}$ client device extends along jagged path 707 after an initial playout latency duration ($t_i^0$) 701. The data associated with the number of segments a client device is permitted to request in advance evolves along path 709, and is greater at any instant that the cumulative data consumed $l_{i,t}$ from the playout buffer and the cumulative data downloaded (or received) $s_{i,t}$ by the $i^{th}$ client device.

As noted above, in some implementations, a method of joint bandwidth allocation $\{c_{i,t}\}$ and encoding-rate segment representation selection $\{r_{i,t}\}$ is based on reducing with reducing MSE distortion D with respective to a joint quality criterion (i.e., a performance metric), in order to provide improvements in video quality Q for a number of client devices. For example, in one specific implementation, the task of joint bandwidth allocation $\{c_{i,t}\}$ and encoding-rate segment representation selection $\{r_{i,t}\}$ includes minimizing the overall video distortion across all streams, for all segments within the time horizon. In furtherance of the example, in some implementations, this is represented by equation (9) as follows:

$$\min_{c,r} \sum_{i=1}^{N} \sum_{m=1}^{M} d_{i,m}(r_{i,m}) \qquad (9)$$

$$\text{s.t.} \quad r_{i,m} \geq r_{i,m}^{(1)}, \forall i, \forall m \qquad (10)$$

$$r_{i,m} \leq r_{i,m}^{(K)}, \forall i, \forall m \qquad (11)$$

$$\Sigma_i c_{i,t} < C, \forall t \qquad (12)$$

$$s_{i,t} > l_{i,t}, \forall i, \forall t \qquad (13)$$

$$s_{i,t} < l_{i,t}^{U}, \forall i, \forall t \qquad (14)$$

For streaming video, it is possible the rate-distortion or rate-quality profiles in advance. When the information is available at a central entity (e.g., headend node 150), the above convex optimization problem can be solved numerically. For example, possible numerical methods include interior-point methods, cutting-plane methods, and subgradient methods. Additionally, as noted above, the disclosed framework is flexible enough to accommodate other variations of quality-based bandwidth allocation using modifications of the objective functions and linear constraints described above. For example, some implementations include reducing or minimizing a weighted sum of distortions across a plurality of streams and segments. In another example, some implementations include reducing or minimizing a tolerable distortion level across a plurality of streams and segments. In yet another example, some implementations include reducing or minimizing a sum of distortions subject to a distortion constraint applicable to a plurality of segments. And in even yet another example, some implementations include substantially equalizing distortion across client streams while adjusting distortion across within each of one or more client streams.

Figure 8:
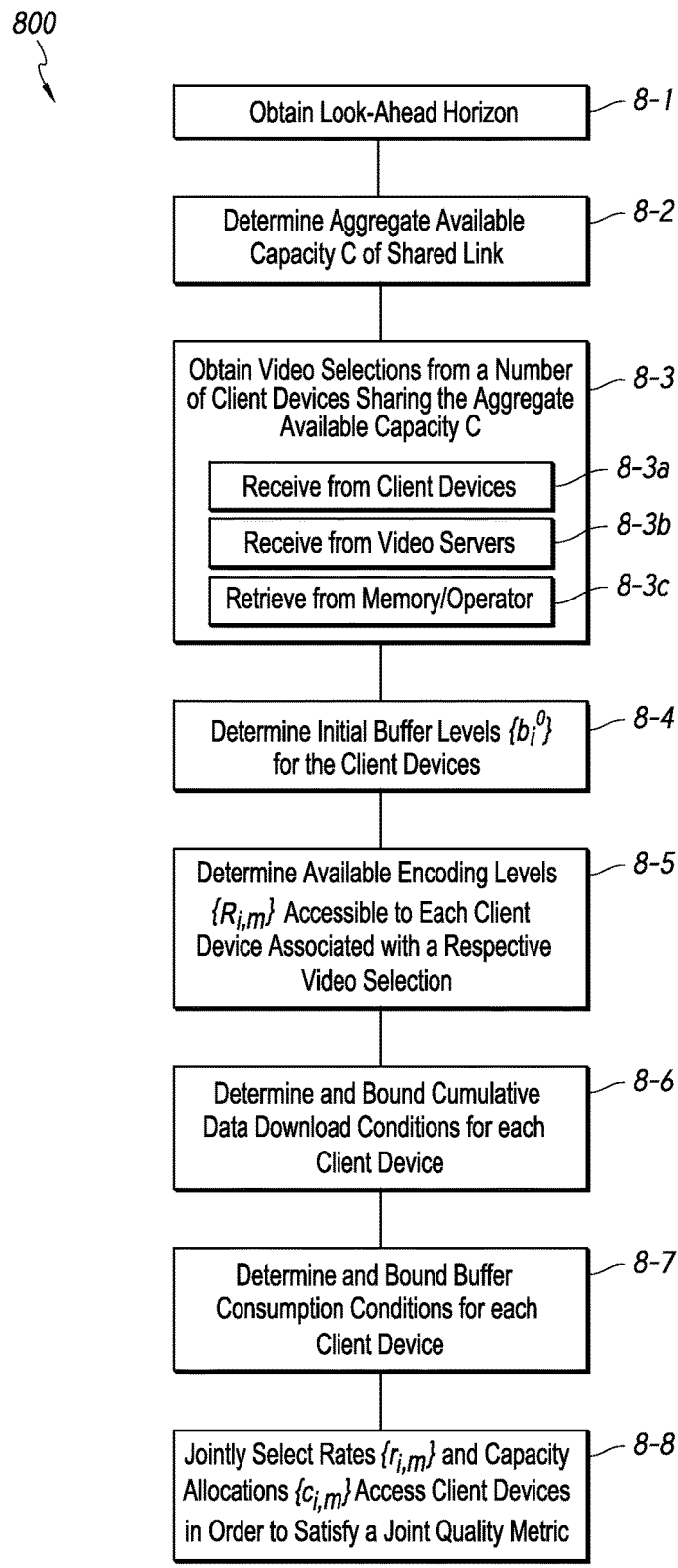
FIG. 8 is a flowchart representation of a method of joint quality management across multiple devices in accordance with some implementations.

FIG. 8 a flowchart representation of a method 800 of jointly allocating bandwidth and selecting segment representations in accordance with some implementations. In some implementations, the method 800 is performed by a resource management module associated with a network administration node (e.g., network administration node 142) and/or a resource bottleneck node (e.g., headend node 150 etc.). Briefly, the method 800 includes obtaining resource constraint values associated with client devices sharing a network resource, and jointly determining a respective encoding rate level and a corresponding resource allocation for each client device in order to satisfy a joint quality criterion.

To that end, as represented by block 8-1, the method 800 includes obtaining a look ahead horizon T. As represented by block 8-2, the method 800 includes determining the aggregate available capacity, C, of a shared link. For example, with reference to FIG. 2, the method includes determining the aggregate bandwidth on bottleneck link 250 available to the client devices 191, 192, 193a/b, 194 and 195. As represented by block 8-3, the method 800 includes obtaining video selections from a number of client devices sharing the aggregate available capacity C. For example, in some implementations, as represented by block 8-3a, obtaining video selections includes querying and receiving indications of the video selections from the client devices. In some implementations, as represented by block 8-3b, obtaining video selections includes querying and receiving indications of the video selections from one or more video servers. In some implementations, as represented by block 8-3c, obtaining video selections includes retrieving indications of the video selections from a non-transitory memory.

As represented by block 8-4, the method 800 includes determining the initial buffer levels $\{b_i^o\}$ for the client devices. In some implementations, determining the initial buffer levels $\{b_i^o\}$ includes querying and receiving buffer level information from the client devices. In some implementations, In some implementations, determining the initial buffer levels $\{b_i^o\}$ includes estimating the initial buffer levels $\{b_i^o\}$ based on prior selections.

As represented by block 8-5, the method 800 includes determining available encoding levels $\{R_{i,m}\}$ for the segment representations accessible to each client device associated with a respective video selection. In other words, the method 800 includes determining the available encoding rates associated with the segments of the video selections made by the client devices. As represented by block 8-6, the method 800 includes determining and bounding cumulative data download conditions for each client device. As represented by block 8-7, the method 800 includes determining and bounding buffer consumption conditions for each client device. For example, in some implementations, the bounding conditions are given by equations (10) to (14) shown above.

As represented by block 8-8, the method 800 includes jointly selecting segment representations $\{r_{i,m}\}$ and capacity (e.g., bandwidth) allocations $\{c_{i,m}\}$ in order to satisfy a joint quality metric, such as reducing MSE distortion D. As noted above, the disclosed framework is flexible enough to accommodate other variations of quality-based bandwidth allocation using modifications of the objective functions and linear constraints described above. For example, some implementations include reducing or minimizing a weighted sum of distortions across a plurality of streams and segments. In another example, some implementations include reducing or minimizing a tolerable distortion level across a plurality of streams and segments. In yet another example, some implementations include reducing or minimizing a sum of distortions subject to a distortion constraint applicable to a plurality of segments. And in even yet another example, some implementations include substantially equalizing distortion across client streams while adjusting distortion across within each of one or more client streams.

Figure 9:
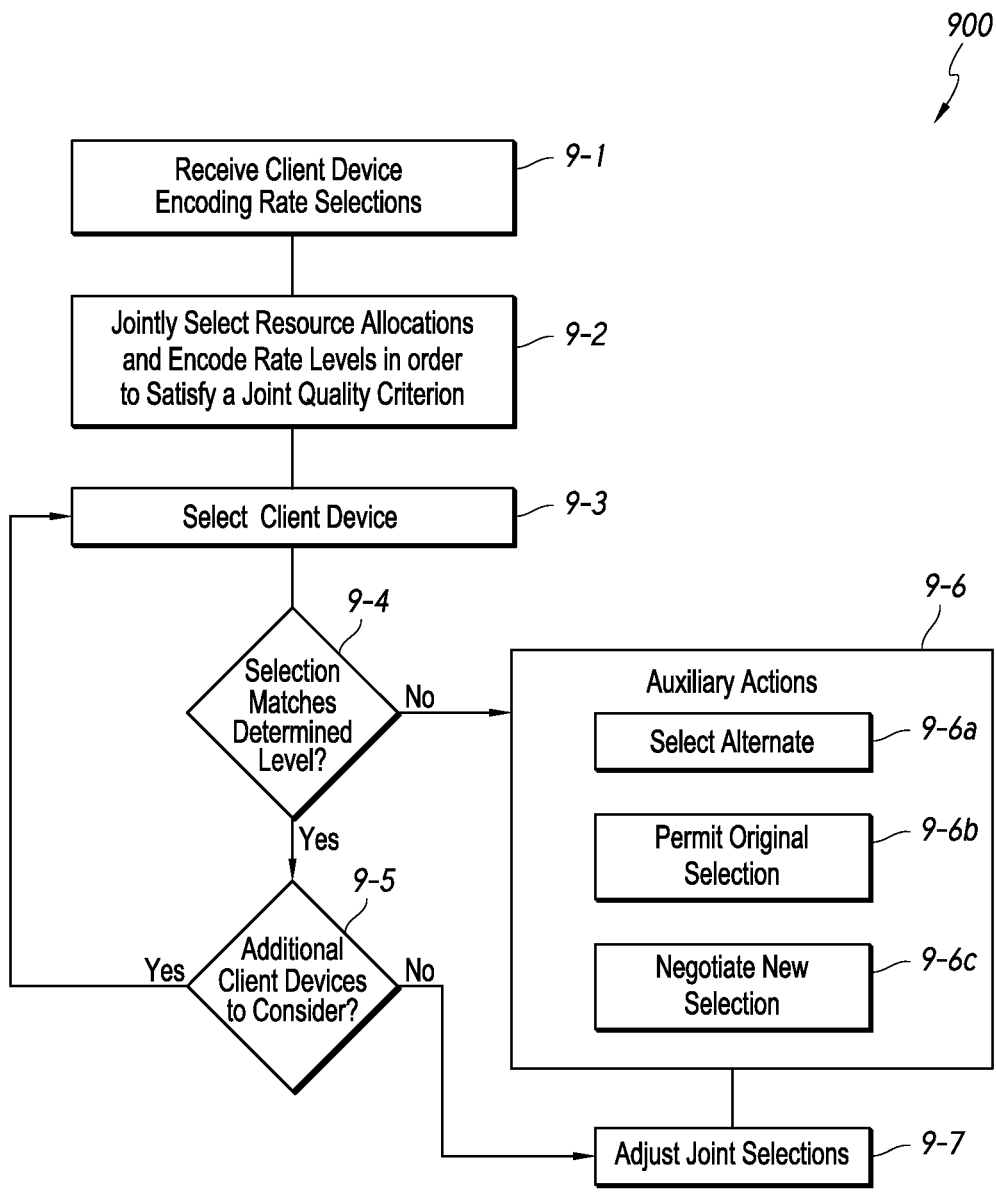
FIG. 9 is a flowchart representation of a method of joint quality management across multiple devices in accordance with some implementations.

FIG. 9 a flowchart representation of a method 900 of jointly allocating bandwidth and selecting segment representations in accordance with some implementations. In some implementations, the method 900 is performed by a resource management module associated with a network administration node (e.g., network administration node 142) and/or a resource bottleneck node (e.g., headend node 150 etc.). Briefly, the method 900 includes receiving client device video selections and jointly determining a respective encoding rate level and a corresponding resource allocation for each client device in order to satisfy a joint quality criterion.

To that end, as represented by block 9-1, the method 900 includes receiving selections of segment representations (i.e., encoding-rate level) from client devices sharing a network resource. As represented by block 9-2, the method 900 includes jointly selecting segment representations $\{r_{i,m}\}$ and capacity (e.g., bandwidth) allocations $\{c_{i,m}\}$ in order to satisfy a joint quality metric, such as reducing MSE distortion D (e.g., as described above with reference to FIG. 8). As represented by block 9-3, the method 900 includes selecting a client device for evaluation. As represented by block 9-4, the method 900 includes assessing whether the segment representation selected by the client device matches the determined segment representation when considering the joint quality metric. If the segment representations match ("Yes" path from block 9-4), as represented by block 9-5, the method 900 includes determining whether additional client devices are left to consider. If there is at least one more client device to consider ("Yes" path from block 9-5), the method circles back to the portion of the method represented by block 9-3. On the other hand, if there are no more client devices left to consider ("No" path from block 9-5), as represented by block 9-7, the method 900 includes adjusting the joint selections of segment representations.

With further reference to block 9-4, if the segment representations do not match ("No" path from block 9-4), as represented by block 9-6, the method 900 includes performing an auxiliary action. For example, as represented by block 9-6a, in some implementations, an auxiliary action includes selecting an alternative video rate selection for a particular client device in response to determining that the respective one of the plurality of video rate selections does not match the corresponding encoding-rate level determined for the particular client device. As represented by block 9-6b, in some implementations, an auxiliary action includes permitting the particular client device to proceed with the selection of the corresponding one of the video rate selections when the corresponding one of the video rate selections falls within a tolerance value. As represented by block 9-6c, in some implementations, an auxiliary action includes negotiating a new segment representation selection with the client device by transmitting a feedback message a particular one of the plurality of client devices in response to determining that the respective one of the plurality of video rate selections does not match the corresponding encoding-rate level determined for the particular client device.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein. In another example, various portions of the disclosed methods may be practiced and/or performed in various sequences and/or combinations, including simultaneously.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a network device including a processing device and a non-transitory memory:
    obtaining a plurality of resource constraint values associated with a plurality of client devices sharing a network resource, wherein each respective resource constraint value characterizes a limiting rate at which media content data can be provided to a particular client device;
    determining a respective encoding rate level and a corresponding resource allocation for each of the plurality of client devices based on a combination of the one or more resource constraint values and the assessment of the respective perceptual quality level values, wherein a combination of resulting quality levels satisfies a joint quality criterion; and
    reallocating a portion of the network resource from a first one of the plurality of client devices to a second one of the plurality of client devices in order to satisfy the joint quality criterion.

2. The method of claim 1, wherein the network resource includes bandwidth, processor time, and memory.

3. The method of claim 1, further comprising assessing a respective perceptual quality level value associated with each of one or more combinations of encoding rate levels and resource allocations for the plurality of client devices.

4. The method of claim 1, wherein the perceptual quality level value includes at least one of MSE distortion, a peak-signal-to-noise ratio, a mean opinion score, a video quality metric, encoding quantization parameter, and subscription tier data.

5. The method of claim 4, wherein the joint quality metric is determined as a function of a plurality of perceptual quality level values.

6. The method of claim 5, wherein the function includes at least one of a statistical characterization, threshold values, and upper or lower bounds.

7. The method of claim 1, wherein determining the joint quality metric includes at least one of:
   reducing distortion across the plurality of client devices;
   reducing a weighted sum of distortions across a plurality of streams and segments;
   reducing a sum of distortions subject to a distortion constraint applicable to a plurality of segments; and
   equalizing distortion across client streams while adjusting distortion across within each of one or more client streams.

8. The method of claim 1, further comprising:
   obtaining a plurality of video rate selections, wherein each of the plurality of video rate selections is associated with a corresponding one of the client devices;
   determining whether or not each plurality of video rate selections substantially matches the corresponding encoding-rate level determined for the corresponding one of the client device.

9. The method of claim 8, further comprising selecting an alternative video rate selection for a particular client device in response to determining that the respective one of the plurality of video rate selections does not match the corresponding encoding-rate level determined for the particular client device.

10. The method of claim 8, further comprising transmitting a feedback message to a particular one of the plurality of client devices in response to determining that the respective one of the plurality of video rate selections does not match the corresponding encoding-rate level determined for the particular client device.

11. The method of claim 8, further comprising permitting the particular client device to proceed with the selection of the corresponding one of the video rate selections when the corresponding one of the video rate selections falls within a tolerance value.

12. The method of claim 1, wherein jointly determining the respective encoding rate level and the corresponding resource allocation for each of the plurality of client devices comprises:
   determining respective initial buffer levels associated with the plurality of client devices; and
   determining a corresponding estimate of cumulative data associated with each of the plurality of client devices as a function of the respective initial buffer levels.

13. The method of claim 12, further comprising constraining the determination of the respective encoding rate level and the corresponding resource allocation for each of the plurality of client devices based on the corresponding estimates of cumulative data associated with the plurality of client devices.

14. A computer program product, embedded on a non-transitory computer readable medium, including instructions that when executed by a processor cause a device to operate to:
   obtain a plurality of resource constraint values associated with a plurality of client devices sharing a network resource, wherein each respective resource constraint value characterizes a limiting rate at which media content data can be provided to a particular client device;
   determine a respective encoding rate level and a corresponding resource allocation for each of the plurality of client devices based on a combination of the one or more resource constraint values and the assessment of the respective perceptual quality level values, wherein a combination of resulting quality levels satisfies a joint quality criterion; and
   reallocate a portion of the network resource from a first one of the plurality of client devices to a second one of the plurality of client devices in order to satisfy the joint quality criterion.

15. The computer program product of claim 14, further comprising instructions when executed by the processor cause the device to operate to assess a respective perceptual quality level value associated with each of one or more combinations of encoding rate levels and resource allocations for the plurality of client devices.

16. The computer program product of claim 14, wherein the perceptual quality level value includes at least one of MSE distortion, a peak-signal-to-noise ratio, a mean opinion score, a video quality metric, an encoding rate, encoding quantization parameter, and subscription tier data.

17. The computer program product of claim 16, wherein the joint quality metric is determined as a function of a plurality of perceptual quality level values.

18. The computer program product of claim 14, wherein determining the joint quality metric includes at least one of:
   reducing distortion across the plurality of client devices;
   reducing a weighted sum of distortions across a plurality of streams and segments;
   reducing a sum of distortions subject to a distortion constraint applicable to a plurality of segments; and
   equalizing distortion across client streams while adjusting distortion across within each of one or more client streams.

19. The computer program product of claim 14, wherein jointly determining the respective encoding rate level and the corresponding resource allocation for each of the plurality of client devices comprises:
   determining respective initial buffer levels associated with the plurality of client devices; and
   determining a corresponding estimate of cumulative data associated with each of the plurality of client devices as a function of the respective initial buffer levels; and
   constraining the determination of the respective encoding rate level and the corresponding resource allocation for each of the plurality of client devices based on the corresponding estimates of cumulative data associated with the plurality of client devices.

20. An apparatus comprising:
   logic configured to obtain a plurality of resource constraint values associated with a plurality of client devices sharing a network resource, wherein each respective resource constraint value characterizes a limiting rate at which media content data can be provided to a particular client device;
   logic configured to jointly determine a respective encoding rate level and a corresponding resource allocation for each of the plurality of client devices based on a combination of the one or more resource constraint values and the assessment of the respective perceptual quality level values, wherein a combination of resulting quality levels satisfies a joint quality criterion; and logic configured to reallocate a portion of the network resource from a first one of the plurality of client devices to a second one of the plurality of client devices in order to satisfy the joint quality criterion.

\* \* \* \* \*